US005951856A

United States Patent [19]

Cho

[11] Patent Number: 5,951,856

[45] Date of Patent: Sep. 14, 1999

[54] WATER HARDNESS REDUCTION THROUGH INTERACTIVE MOLECULAR AGITATION AND FILTRATION

[75] Inventor: Young I. Cho, Cherry Hill, N.J.

[73] Assignee: Electronic Descaling 2000, Inc., Boothwyn, Pa.

[21] Appl. No.: 08/791,752

[22] Filed: Jan. 29, 1997

Related U.S. Application Data

[63] Continuation-in-part of application No. 08/544,156, Oct. 17, 1995, Pat. No. 5,725,778, which is a continuation-in-part of application No. 08/736,231, Oct. 23, 1996, Pat. No. 5,846, 414.

[51] Int. Cl.[6] .............................. B01D 35/00; C02F 1/48

[52] U.S. Cl. .......................... 210/138; 210/222; 210/223; 210/243; 210/695; 210/748; 204/660; 204/665; 335/209

[58] Field of Search .................................... 210/222, 223, 210/243, 295, 748, 695; 204/660, 665; 335/204

[56] References Cited

U.S. PATENT DOCUMENTS

| | | | |
|---|---|---|---|
| 5,074,998 | 12/1991 | De Baat Doelman | 210/222 |
| 5,670,041 | 9/1997 | Cho et al. | 210/695 |
| 5,725,728 | 3/1998 | Cho et al. | 210/695 |

*Primary Examiner*—David A. Reifsnyder
*Attorney, Agent, or Firm*—Robert S. Lipton, Esq.; Lipton, Weinberger & Husick

[57] ABSTRACT

The “hardness” of water flowing through a pipe, and attributable to ions dissolved in the water, is reduced by producing molecular agitation in the water to transform the ions into much larger crystals, followed by filtration using a conventional filter having a mesh size much larger than the size of the ions, but smaller than the size of the crystals.

13 Claims, 3 Drawing Sheets

WATER HARDNESS REDUCTION THROUGH INTERACTIVE MOLECULAR AGITATION AND FILTRATION

CONTINUING DATA

This application is a continuation-in-part of my U.S. applications, Ser. No. 08/544,156, filed Oct. 17, 1995, issued Mar. 10, 1998 as U.S. Pat. No. 5,725,778; and Ser. No. 08/736,231, filed Oct. 23, 1996, now U.S. Pat. No. 5,846,414.

BACKGROUND OF THE INVENTION

The present invention relates to water purification and more particularly to the removal of dissolved minerals and carbonates from water in order to diminish its so-called "hardness".

The overwhelming majority of water in the United States is "hard". Elsewhere, this proportion may vary, but hard water is found in many, if not most regions of the world. Where it is found, it creates serious difficulties. Not only does it cause scale to form inside the pipes, storage vessels, and the like in which the water is contained, but it causes problems even after passage through these containers. For example, hard-water makes it necessary to use excessive quantities of water softeners and/or soap or detergent when the water is used for washing, and it also leaves calcium-type deposits analogous to scale in or on the articles washed with that water. As another example, hard water dissolves some substances less readily than water whose hardness has been reduced, or eliminated.

The substances which cause hardness in water normally are present in the form of dissolved ions, predominantly calcium and bicarbonate ions. Due to their extremely small size (of the order of $10^{-10}$ microns), these dissolved ions cannot be readily filtered out of the water using conventional and relatively inexpensive water filters. Rather, more exotic removal techniques have had to be used, such as reverse osmosis or ion exchanger. Those techniques are too expensive for use in other than specialized applications. For example, for domestic usage, the multi-hundred dollar cost of a reverse osmosis installation tends to be regarded as prohibitive by most prospective users, and this problem would be compounded by the need to professionally service the installation, also at substantial recurrent cost for maintenance.

Alternatively, chemicals could be added to the "hard" water to soften it. However, these chemicals, in turn, have residues which have their own undesirable characteristics. For example, adding sodium chloride (used in conventional water softeners) leaves behind, in the (softened) water, the sodium portion, with its well-known undesirable side effects.

BRIEF DESCRIPTION OF THE INVENTION

Accordingly, it is an object of the invention to provide a water purification technique which reduces problems prevailing in the prior art.

It is another object to provide such a technique which reduces the hardness of water without the need for exotic techniques, such as reverse osmosis, or addition of chemicals.

It is still another object to provide such a technique which is as convenient to utilize as conventional filtration techniques.

These and other objects of the invention which will appear are achieved as follows.

Molecular agitation is produced in the water whose hardness is to be reduced. This is accomplished by means of an induction coil which is applied to the water-carrying vessel and which is energized by an intermittent unidirectional current, or by an alternating current. This molecular agitation transforms the calcium and carbonate ions which are present in solution in the water into insoluble calcium carbonate crystals of many times greater size (of the order of one micron). The water containing these crystals is then supplied to a filtration means, which may take any conventional form that is inherently too coarse to intercept the dissolved ions. Such a coarse filtration means may be an ordinary fiber filter having a porosity, or mesh size which is typical of filters for domestic use. Such a fiber filter would have been quite incapable of filtering out the dissolved ions which impart hardness to the water in the first place. However, used in interaction with molecular agitation, fiber filters can readily—and inexpensively—filter out the (relatively large) crystals which are created by the molecular agitation, thereby reducing the water hardness.

It should be noted that molecular agitation, by itself, had previously been proposed for a different purpose. Specifically, it had been recognized that, particularly when hard water is heated, the dissolved ions such as calcium and bicarbonate in the water form a type of calcium carbonate which tends to cling to the walls, or adhere to the bottom of the vessel carrying the heated water. This creates scale deposits inside the vessel. By producing molecular agitation upstream from the water heating, this scale formation process can be reduced, or even reversed so as to remove previously formed scale deposits.

What had not been recognized is that the same kind of molecular agitation can also interact beneficially with inexpensive conventional filtration means so as to reduce the hardness of the water.

BRIEF DESCRIPTION OF THE DRAWINGS

For further details, reference is made to the discussion which follows, taken in light of the accompanying drawings, wherein.

It will be understood that these diagrammatic illustrations are not drawn to scale.

DETAILED DESCRIPTION

Figure 1:
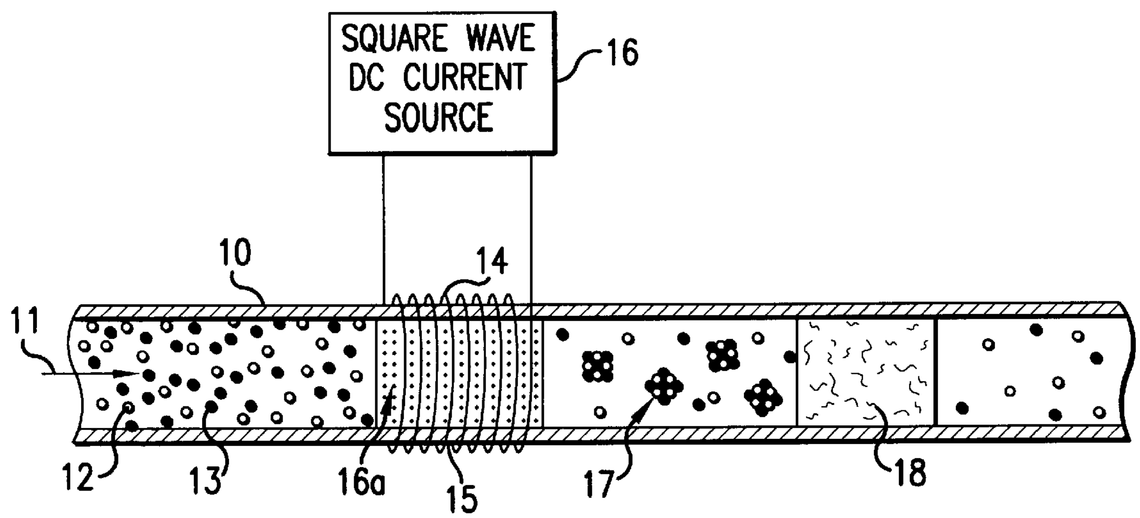
FIG. 1 is a diagram illustrating the principles of the invention.

Referring now to FIG. 1, this shows a pipe 10, through which flows "hard" water in the direction of arrow 11. This water contains, in solution, calcium ions 12 (represented by small open circles) and bicarbonate ions 13 (represented by small solid circles). A solenoid coil 14 is wound around a section 15 of the pipe 10. Coil 14 is supplied with a square-wave d-c current from a source 16 of such current.

Within section 15, this current causes molecular agitation of the ions 12 and 13, which are dissolved in the water flowing through that section 15. This state of molecular agitation is diagrammatically represented in FIG. 1 by the pattern of dots 16*a*. In turn, this molecular agitation causes controlled precipitation of insoluble calcium carbonate crystals. These crystals are designated by reference numeral 17 in FIG. 1.

Downstream from pipe section 15 there is positioned a filter 18. As discussed more fully below, this filter 18 has a mesh size such that it intercepts the crystals 17. As a result, after passing through filter 18, the water flowing in pipe 10 is substantially cleansed of many of those dissolved ions 12 and 13, which have been transformed into insoluble crystals 17 by the molecular agitation.

Thus, in accordance with the present invention, the filter 18 can have a mesh size which is many times greater than the size of the ions 12 and 13 which impart the undesired "hardness" to the water. For example, ordinary fabric water filters can be used, such as are readily (and inexpensively) available in hardware and plumbing supply stores. These filters have typical mesh sizes ranging from approximately 1 to 20 microns. By themselves, such filters would be totally incapable of filtering out the much, much smaller ions 12 and 13.

In contrast, the large size of the crystals 17 which are produced by the molecular agitation in pipe section 15 does make it possible for such an ordinary filter 18 to intercept these crystals 17.

An ancillary benefit of the present invention is this. The transformation by molecular agitation of dissolved ions 12 and 13 into insoluble crystals 17 also reduces the tendency of these ions to deposit on the inside of pipe 10, downstream from pipe section 15, thereby also reducing deleterious scale formation in downstream locations. This additional benefit is especially pronounced when these locations downstream from section 15 and filter 18 include a place where the water is heated, e.g. a domestic hot water heater. That is because heating increases the tendency toward scale formation, and correspondingly enhances the desirability of counteracting such scale formation.

Further details concerning the electric current supplied to coil 14, as well as apparatus suitable for producing such a current, are disclosed in co-pending United States patent application Ser. No. 08/544,156 filed Oct. 17, 1995 which issued on Mar. 10, 1998 as U.S. Pat. No. 5,725,778. The contents of that co-pending application are incorporated in the present application, as though set forth at length herein.

In practice, the filter 18 of FIG. 1 would preferably not be simply a plug of fabric filtration material, inserted in pipe 10, as shown in the FIG. 1. Rather, there would be used a more conventional filter arrangement, such as diagrammatically illustrated in FIG. 2, to which reference may now be had.

Figure 2:
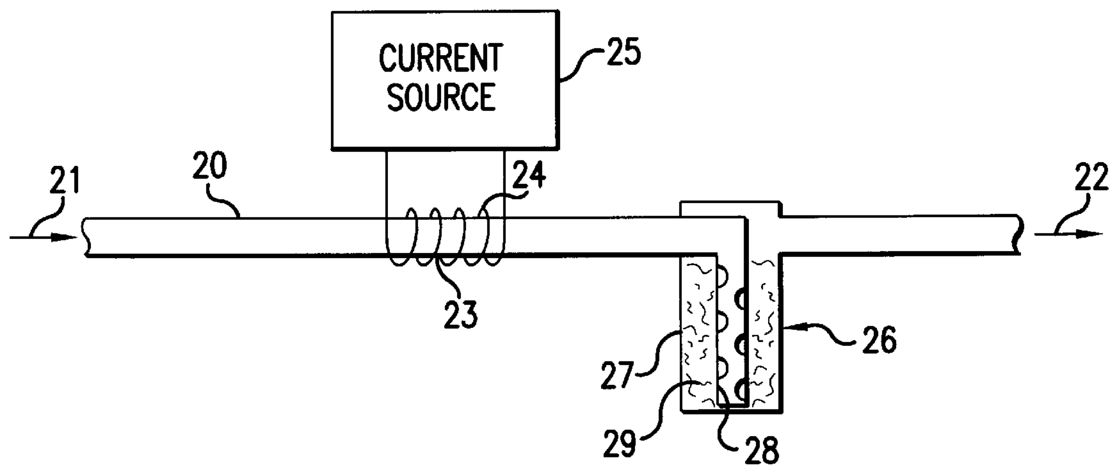
FIG. 2 is a diagrammatic representation of an embodiment of the invention.

FIG. 2 shows a pipe 20 through which flows ion-rich "hard" water in the direction of arrows 21, 22. Molecular agitation is produced inside pipe section 23 by coil 24, which is supplied with square-wave d-c current from source 25. Insoluble crystals are present downstream from section 23, due to this molecular agitation. The same comments apply to this apparatus as to the correspondingly functioning elements of the embodiment of FIG. 1. The difference is that, in FIG. 2, the filter 26 is now not simply a fabric filter plug inside the pipe, as was the case in the illustration of FIG. 1, but rather what will be referred to in this application as a cylindrical filter. This consists of an outer cylindrical element 27, having a central, perforated conduit 28 which effectively constitutes the filter inlet, and a cylinder 29 of fabric filter material which surrounds conduit 28 and through which the water issuing from the perforations in conduit 28 passes on the way back to the continuation of pipe 20.

This is a well-known type of water filter used, for example, in many domestic water filtration applications. To service this filter, it suffices to detach the cylinder 27 from its connections to water pipe 20, replace the fabric cylinder 29, and then reattach the assembly to the water pipe.

The fabric cylinder 29, itself, is available with various mesh sizes, but none which come even close to being able to intercept dissolved ions. In contrast, these fabric cylinders can readily—and inexpensively—be obtained with fine enough mesh size to intercept the large crystals formed by the preceding molecular agitation.

Figure 3:
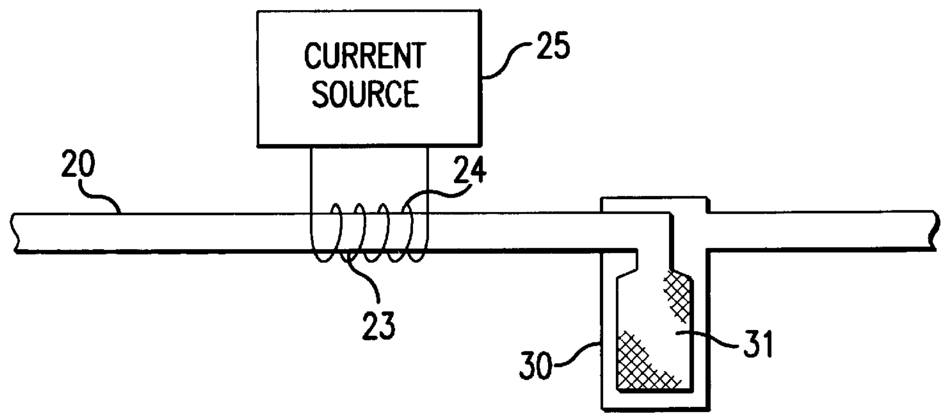
FIG. 3 is a diagrammatic representation of an embodiment using a different filtration means.

Referring now to FIG. 3, this shows apparatus which is similar to that of FIG. 2, and corresponding elements are therefore designated by the same reference numerals. However, the filtration means in FIG. 3 does not use a fabric filter 29, as in FIG. 2, but a different type of cylindrical filter.

This cylindrical filter of FIG. 3 also has a cylindrical outer housing 30, inside which there is a bag-shaped inner cylinder 31. The water arriving through pipe 20 is introduced into cylinder 31 at its top. This cylinder 31 is made of metal or fabric mesh, with openings which can readily be made as small as 1 micron. Crystals arriving through pipe 20 and in excess of 1 micron size will therefore be intercepted by cylinder 31. The water, now freed from these crystals, will pass through the mesh openings in cylinder 31 and into the space between that cylinder and housing 30. From that space it will flow out of housing 30 and into the continuing portion of pipe 20. To service this filter of FIG. 3, it suffices to detach the housing 30 from its connections to water pipe 20, either replace or clean out the mesh cylinder 31, and then reattach the assembly to the water pipe.

As noted above, a mesh filter such as shown in FIG. 3 can readily have a smaller mesh size than the kind of fabric filter as shown in FIG. 2. However, even those smaller mesh sizes are still much too large to intercept ions, while being capable of intercepting the large crystals produced by molecular agitation.

Figure 4:
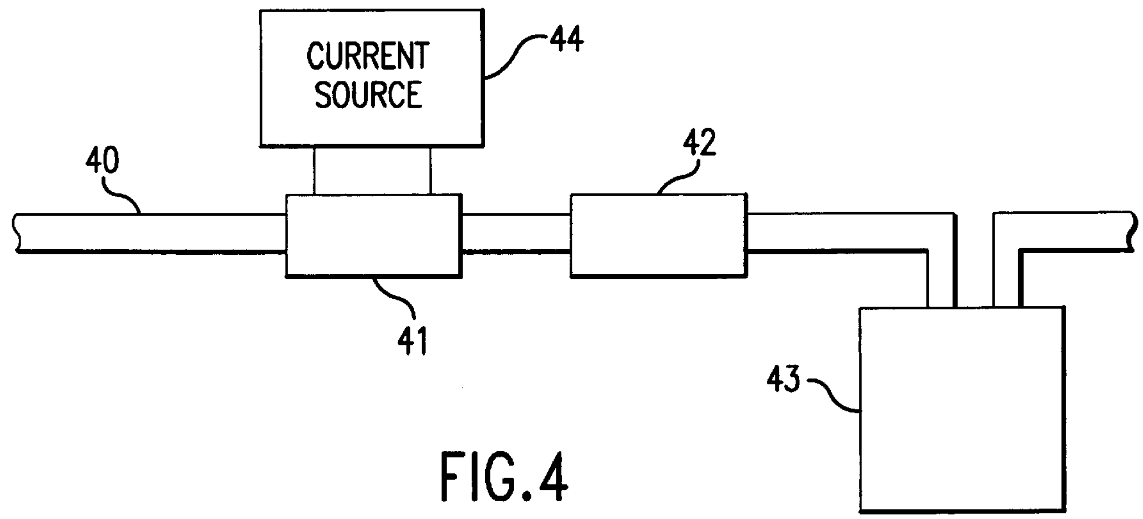
FIG. 4 is a diagrammatic representation of an embodiment for use in a domestic environment.

Referring now to FIG. 4, this shows the invention as applied in a typical domestic situation.

The main domestic water pipe 40 has applied to it a solenoid coil 41 for producing molecular agitation. This coil 41 is diagrammatically represented In FIG. 4 by the rectangle which bears the reference numeral 41.

Pipe 40 then continues to a filter 42 which is diagrammatically represented by a rectangle bearing the reference numeral 42.

From filter 42, pipe 40 continues to domestic hot water heater 43 and may also branch to other piping (not shown) for supplying unheated water for various domestic uses.

The system of FIG. 4 also includes a d-c current source 44 for coil 41. That current source 44 is a circuit, which can be plugged into an ordinary domestic electric outlet (not shown) and which produces a square d-c output current at a frequency of 500 Hertz and a power level of 5 watts. Such circuitry may be of entirely conventional construction and is therefore not further described here. However, for a more detailed disclosure of such circuitry, reference is again made to the above-identified co-pending U.S. patent application, Ser. No. 08/544,156, filed Oct. 17, 1995, now U.S. Pat. No. 5,725,778.

As for the coil 41, this is preferably of a construction which can be described as "saddle-shaped", and it is positioned eccentrically in relation to the pipe 40. This type of coil arrangement is disclosed in detail in co-pending U.S. patent application, Ser. No. 08/736,231, filed Oct. 23, 1996 now U.S. Pat. No. 5,846,414 whose contents are hereby incorporated in the present application, as though fully set forth herein.

By the use of circuit 44 and coil 41 as disclosed herein, the installation of the invention on a domestic water supply becomes a simple matter that even a non-professional should be able to carry out.

Figure 5:
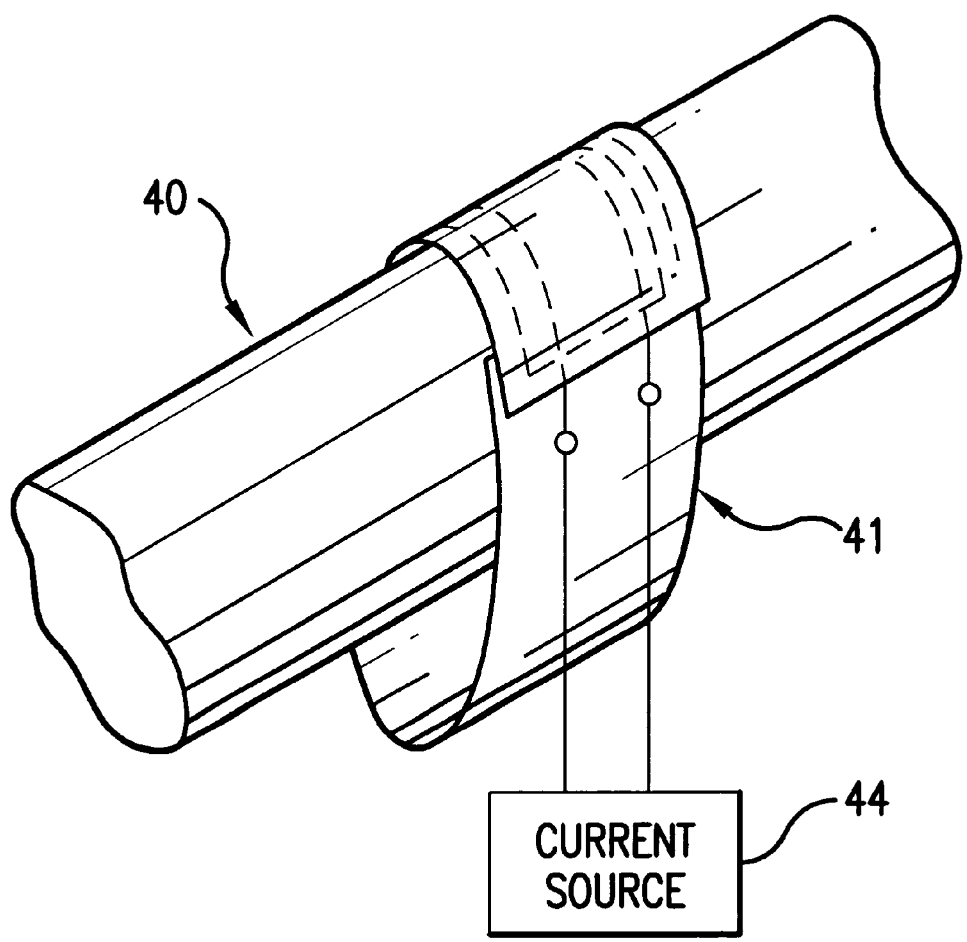
FIG. 5 is a diagrammatic representation of a saddle-shaped coil.

All the component parts can be made available for purchase in, for example, a home improvement store. The circuit 44 would be available already pre-connected to coil 41 through the equivalent of an electrical extension cord, and the coil 41 itself would be in one of the forms disclosed with reference to FIGS. 3, 4 and 5 of the above-identified co-pending application, Ser. No. 08/736,231, filed Oct. 23, 1996. Such a coil would need only to be placed around the pipe 40, as shown in said FIGS. 4 and 5. Domestic water pipes are typically only about 1 to 1½ inches in diameter, so that a correspondingly small coil arrangement 41 would suffice. The circuit 44 would then be simply plugged into a convenient domestic electric outlet and the system would be ready to function.

As for filter 42, this would again be any conventional, domestic water filter, such as the type illustrated in FIG. 2 of the present application.

In such a domestic application, the interactive effect of molecular agitation and filtration is especially beneficial for the following reason.

In a domestic hot water heater, such as heater 43 in FIG. 4, the water tends to flow very slowly, or even to stagnate completely when hot water is not being used. As a result, without the interactive effect of both coil 41 and filter 42, not only ions, but even large crystals (however produced) would tend to settle out and deposit on the heated surfaces inside the heater tank, thereby impairing the efficiency of the heater.

By also removing ions and large crystals before they reach the hot water heater 43, such an efficiency impairment is substantially reduced.

It will be understood that the transformation of ions (12 and 13 in FIG. 1) into large crystals (17) is not necessarily complete. Rather, some ions may escape this transformation, and therefore also escape interception by the downstream filtration means (see FIG. 1). However, the hardness of the water will, in any event, be substantially reduced.

Indeed, in laboratory experiments using a system in which the water was continuously recirculated through a coil 14 and a filtration means 18, the invention has achieved alkalinity (i.e. hardness) reductions of up to 35%.

It will be understood that many modifications may be made by those skilled in the art without departing from the inventive concept. Accordingly, it is desired that this concept be limited only by the appended claims.

I claim:

1. A system for reducing the "hardness" of water attributable to ions contained in solution in the water, comprising:

filtration means having a mesh size substantially greater than the size of said ions;

means for transforming at least some of the ions into insoluble crystals contained in said water and of a size sufficiently large to be intercepted by said filtration means, said means for transforming includes an induction coil means and means for supplying a time-varying electric current, in the form of a square wave d-c current, to said coil means, said induction coil means being in a saddle-shaped configuration and positioned in relation to the ion containing water so as to produce a time-varying electric and magnetic field within the ion containing water; and means for supplying said water from said transforming means to said filtration means.

2. The system of claim 1, wherein said filtration means is a fabric filter.

3. The system of claim 2, wherein said means for supplying said water is a pipe and said fabric filter is of an in-line type used between two pipe sections.

4. The system of claim 2, wherein said filtration means is a cylindrical fabric filter.

5. The system of claim 2, wherein said fabric filter has a mesh size ranging between approximately 1 to 20 microns.

6. The system of claim 1, wherein said filtration means is a cylindrical metal screen filter.

7. The system of claim 1, wherein the water flows through a pipe and the induction coil means is positioned to produce said time-varying field in the water which flows through said pipe.

8. The system of claim 7, wherein means are provided for heating said water in a location downstream from both said coil means and said filtration means.

9. The system of claim 8, wherein the heating means is a domestic hot water heater.

10. The system of claim 7, wherein said coil means comprises at least one wire coil wrapped at least partially around said pipe.

11. The system of claim 10, wherein said wrapped wire coil is positioned eccentrically in relation to said pipe.

12. The system of claim 1 wherein said means for supplying water is a pipe and said filtration means is a fabric plug inserted into the pipe.

13. A system for reducing the "hardness" of water attributable to ions suspended in the water, the water being transported by a pipe, the system comprising:

an induction coil means placed around the pipe in a saddle-shape configuration;

means for supplying a time-varying electric current, in the form of a square wave d-c current, to said coil means for producing a time-varying electric and magnetic field within the ion containing water and transforming at least some of the ions into insoluble crystals contained in said water; and filtration means having a mesh size substantially greater than the size of said ions for capturing said crystals.

* * * * *